United States Patent [19]
Adams

[11] 3,933,631
[45] Jan. 20, 1976

[54] METHOD OF OPERATING ION EXCHANGE SYSTEM

[75] Inventor: Ralph C. Adams, Midland Park, N.J.

[73] Assignee: The Permutit Company, Inc., Paramus, N.J.

[22] Filed: May 6, 1974

[21] Appl. No.: 467,135

[52] U.S. Cl. ................................................. 210/34
[51] Int. Cl.² ....................................... B01D 15/06
[58] Field of Search ........................... 210/30, 32, 34

[56] References Cited
UNITED STATES PATENTS

| | | | |
|---|---|---|---|
| 2,458,115 | 1/1949 | Swenson | 210/30 |
| 2,754,261 | 7/1956 | Akeroyd | 210/32 |
| 3,312,617 | 4/1967 | Klein | 210/30 |
| 3,421,984 | 1/1969 | Jensen et al. | 210/30 |
| 3,632,506 | 1/1972 | Adams et al. | 210/34 |

FOREIGN PATENTS OR APPLICATIONS 831,206  3/1960  United Kingdom

OTHER PUBLICATIONS

R. C. Adams, *Progressive Mode* (TM), *A New Approach to Ion Exchange*, Permutit Technical Bulletin, Vol. VIII, No. 1, Apr. 1970.

*Primary Examiner*—Charles N. Hart
*Assistant Examiner*—Ivars Cintins
*Attorney, Agent, or Firm*—Theodore B. Roessel; James A. Rich

[57] ABSTRACT

An ion exchange system having a number of vessels containing beds of ion exchange material that remain in the same vessel during exhaustion and regeneration is operated so that the efficiency of exhaustion and regeneration is increased and the amount of time the vessels and ion exchange material stand idle is reduced. A number of vessels are connected in parallel in service while other vessels are connected in series for regeneration. Vessels with freshly regenerated ion exchange material are connected in series with the service vessel containing the most nearly exhausted bed of ion exchange material while that bed is being substantially completely exhausted.

3 Claims, 20 Drawing Figures

METHOD OF OPERATING ION EXCHANGE SYSTEM

BACKGROUND OF THE INVENTION

The present invention relates generally to a fixed bed method for the operation of ion exchange apparatus. More specifically, the present invention relates to a method for the sequential exhaustion and regeneration of a number of fixed beds of ion exchange material wherein each bed is always in a different phase of exhaustion or regeneration from any other bed.

During the service cycle of a fixed bed ion exchanger, the bed of ion exchange material may be considered as divided into three adjacent zones. The first zone, which lies immediately in contact with the incoming fluid to be treated, becomes exhausted in its ability to exchange ions with those in the incoming fluid after only a brief period of operation. The second zone is a transitional zone which is only partly exhausted in its ion exchange ability. The third zone consists of ion exchange material which has not been in contact with any exchangeable ions in the incoming fluid and has the greatest ion exchange ability.

As the service operation continues, with the fluid to be treated flowing through the bed, the interfaces between the three zones move through the bed of ion exchange material in the direction of the service flow, until the third zone is displaced by the second, or partially exhausted zone. At this point in the operation of a fixed bed ion exchanger, the ability of the bed to remove ions from the incoming fluid deteriorates and unwanted ions may be detected in the effluent of treated fluid from the bed. Accordingly, in normal operation, the service cycle of the ion exchanger is usually terminated before the second or partially exhausted zone has completely displaced the third zone even though the bed still contains some material capable of performing an ion exchange function. It is thus apparent that in normal operation, the full ion exchange capacity of the fixed bed cannot be utilized without deterioration of effluent quality.

A similar situation develops, only in reverse, during regeneration of a fixed bed ion exchanger in that the regenerant solution passing through the exhausted material displaces previously exchanged ions from the ion exchange material so that after a brief period of operation three zones are formed. The first zone contains regenerated ion exchange material, the second zone contains partially regenerated ion exchange material and the third zone contains exhausted ion exchange material. The interfaces between the zones move through the bed in the direction of regenerant flow. When the third or exhausted zone has been displaced by the second or partially regenerated zone, the ability of the regenerant to regenerate the bed deteriorates and unused regenerant may be detected in the effluent from the bed.

In most instances, ion exchange materials are regenerated with a regenerant solution that contains an amount of ions substantially in excess of the stoichiometric amount necessary to displace the ions that have been removed by the ion exchanger. In general the larger the excess employed, the more complete the displacement of the removed ions from the ion exchange material, the resultant improvement in effluent quality and ion exchanger capacity. This excess regenerant is usually discharged to waste. As a result, conventional fixed bed operation is usually inefficient in both service operation and regeneration in that (a) incomplete use is made of the ion exchange material during service and (b) regeneration of all exhausted ion exchange material requires that some regenerant be wasted.

The efficiency of exhaustion of ion exchange material can be improved by moving ion exchange material through the system in a direction counter to the service flow so that the three zones described above remain generally stationary with respect to service flow. Similarly, the exhausted ion exchange material can be moved counter to the flow of regenerant so that the exhausted material is contacted with an increasing concentration of regenerant. While counter current ion exchange makes more efficient use of both the ion exchange material and the regenerant, the hydraulic and mechanical problems presented in moving the material often outweigh the inefficiency of fixed bed operation. As a result, the inefficiency of conventional fixed bed operation is often overlooked in order to benefit from ease of operation.

One method of improving the efficiency of both the exhaustion and regeneration of the ion exchange material without sacrificing the benefits of leaving the material in place is disclosed in U.S. Pat. No. 3,632,506 to R. C. Adams and J. R. Anderson, and Permutit Technical Bulletin Vol. VIII, No. 1, *Progressive Mode (TM), A New Approach to Ion Exchange*, The Permutit Co. Inc., Paramus, N.J., April 1970. In the processes disclosed therein, the fluid being treated is passed through one vessel while at least two vessels are regenerated in series, with the regenerant passing through at least one partially regenerated bed and then through a completely exhausted bed. When the first bed in the regeneration series is regenerated it is returned to service, by opening and closing various valves that connect the vessels in the system to each other, and connected in series with the vessel through which the fluid being treated is passing. In this position, the freshly regenerated bed acts as a polisher and makes it possible to utilize substantially the full ion exchange capacity of the first bed in the service series before that bed is removed from service for regeneration. Thus, the efficiency of exhaustion or utilization of the ion exchange material is improved.

When the first bed in the service series has been substantially completely exhausted it is removed from service, by operating appropriate valves, and added to the end of a regeneration series, where it is contacted with partially spent regenerant effluent from a partially regenerated resin bed. The regenerant always passes through at least two vessels in a series, and the point of regenerant introduction is moved from vessel to vessel as the beds are regenerated. Consequently, each bed is contacted with substantially more than the stoichiometric amount of regenerant, but substantially complete utilization of the regenerant is achieved.

Thus, it may be seen that the processes disclosed in the above mentioned patent and bulletin, by moving the points where the fluid being treated and the regenerant are introduced into the system, provide significant increases in the efficiency of exhaustion and regeneration of the ion exchange material without moving the material and still provide continuous flow to service at all times.

Under the procedure described in the foregoing patent and bulletin each vessel is in the primary or upstream service position for at least a period of time equal to the time required for one regeneration step, i.e. the time required to backwash an exhausted bed, pass regenerant in series through a partially exhausted bed and an exhausted bed and rinse a regenerated bed; plus the time during which one resin bed is in the polishing or downstream service position. Consequently, for continuous service flow each vessel must contain sufficient resin capacity to remove the exchangeable ions from the influent supply during regeneration step and one polishing step.

Ideally, for minimum resin inventory per vessel, the time for primary service and the time for one regeneration step plus the polishing step should be equal, assuming a constant flow rate of treated fluid from the system and a constant concentration of exchangeable ions in the influent to the system. However, the specific rate of flow of fluid through the ion exchange resin bed, i.e. the flow per unit volume of resin, must fall within certain parameters for various ion exchange resins, otherwise incomplete ion exchange and poor effluent quality or excessive pressure loss develop, which may be economically detrimetal and/or cause excessive damage to the ion exchange resin particles.

In some instances, the amount of resin that must be provided in order to keep the specific flow rate in the desired range is greater than the minimum resin volume required to handle the primary service flow during regeneration and polishing service. For example, under one possible condition a cation exchange resin may have the following characteristics in the service described herein.

Resin capacity per cubic foot — 10,000 grains
Maximum flow rate per cubic foot of resin — 10 gallons per cubic foot per minute.
Time for regeneration — 40 minutes.
Time for polishing service — 10 minutes.

If, under these condition, the system flow rate is 1,000 gallons per minute with an exchangeable ion content of 20 grains per gallon, the minimum resin volume required to handle the primary service flow during regeneration and polishing service would be $$\frac{1,000 \text{ gpm} \times 20 \text{ grains/gallon} \times 50 \text{ minutes}}{10,000 \text{ grains/cubic foot}} = 100 \text{ cubic feet}$$

The maximum flow rate per cubic foot of resin would then be $$\frac{1,000 \text{ gpm}}{100 \text{ cubic feet}} = 10 \text{ gpm/cubic foot}$$

This meets the design parameters given above.

However, if this same resin, with the same design parameters, were to operate with a system flow requirement of 1,000 gpm with an exchangeable ion content of 10 grains per gallon then the minimum resin volume required per vessel to handle the service flow during regeneration and polishing service would be $$\frac{1,000 \text{ gpm} \times 10 \text{ grains/gallon} \times 50 \text{ minutes}}{10,000 \text{ grains per cubic foot}} = 50 \text{ cubic feet}$$

The maximum flow rate per cubic foot of resin would be $$\frac{1,000 \text{ gpm}}{50 \text{ cubic feet}} = 20 \text{ gpm per cubic feet,}$$

which is too high for the design parameters given, and a minimum volume of $$\frac{1,000 \text{ gpm}}{100 \text{ gpm per cubic foot}} = 100 \text{ cubic feet}$$

would have to be provided in each vessel.

SUMMARY OF THE INVENTION

It is an object of this invention to provide methods for improving the efficiency of exhaustion and regeneration of fixed bed ion exchangers in which the service cycle is substantially longer than the regeneration cycle.

Another object is to provide methods for improving the efficiency of exhaustion and regeneration of fixed bed ion exchangers that also reduce the amount of ion exchange material and equipment required in processes wherein the service cycle is substantially longer than the regeneration cycle.

The invention utilizes an ion exchange system having at least four vessels, each of which contains a bed of ion exchange material that is in a different stage of exhaustion or regeneration from any other bed in the system. Valves and conduits connect the vessels in parallel with each other for primary service, or in series so that the downstream vessel acts as a polisher.

The beds are exhausted and regenerated in sequence one after another by connecting various combinations of vessels to form different service and regeneration groups and thereby move the points where the fluid being treated and the regenerant or regenerants are introduced into the system. In the first step, two or more vessels, which contain partially exhausted beds in differing stages of exhaustion, are connected in parallel to form a first service group and the fluid being treated passes in parallel through the vessels. At the same time, a vessel containing a bed of exhausted ion exchange material that has just been removed from service is connected in series with at least one vessel containing a partially regenerated bed to form a first regeneration group. As in the processes disclosed in the patent and bulletin mentioned above, the regenerant passes through the vessels in the regeneration group in series, contacting the primary or most highly regenerated bed in the series first and contacting the completely exhausted bed last.

After the primary bed in the regeneration group has been regenerated, it is returned to service by connecting it in series with a first vessel in the first service group, containing the most nearly exhausted bed in that service group, to form a second service group. The vessel containing the freshly regenerated bed is connected downstream of the first vessel and these two vessels are connected in parallel with the remaining vessel or vessels that were in the first service group. The fluid being treated passes through the second service group until the bed of ion exchange material in the first vessel from the first service group is substantially completely exhausted. During this step, the freshly regenerated bed acts as a polisher, absorbing ions that leak through the bed that is nearing exhaustion.

When the bed in the vessel upstream from the newly regenerated polisher has been exhausted, it is removed from service and connected in series with the vessel or vessels remaining from the first regeneration group to form a second regeneration group. As before, the regenerant is passed through this group or series of vessels so that it contacts the most highly regenerated bed of ion exchange material first and the exhausted material last. At the same time, the vessel that operated as a polisher in the second service group and the other vessel or vessels remaining from that group are all connected in parallel to form a third service group, and the fluid being treated passes in parallel through these vessels.

The foregoing steps are repeated, by connecting vessels containing regenerated ion exchange material in series with service vessels containing the most nearly exhausted beds to form new service groups, and connecting vessels containing exhausted beds in series with and downstream from one or more vessels containing partially regenerated beds to form new regeneration groups, so that the beds of ion exchange material are exhausted and regenerated in sequence. Thus, this invention, like the processes disclosed in the patent and bulletin referred to above, increases the efficiency of exhausting and regenerating the ion exchange material without moving the material.

The number of steps in the exhaustion of each bed will depend on the number of vessels that are connected in parallel in service groups. Thus, by varying the number of vessels that are connected in parallel, the length of one of the steps in the service cycle may be made more nearly equal to the length of one of the regeneration steps, the amount of time during which any particular vessel is idle is reduced, and, as will be seen below, the amount of ion exchange material and the size or number of vessels needed to treat certain fluids are also reduced.

DETAILED DESCRIPTION

Figure 1:
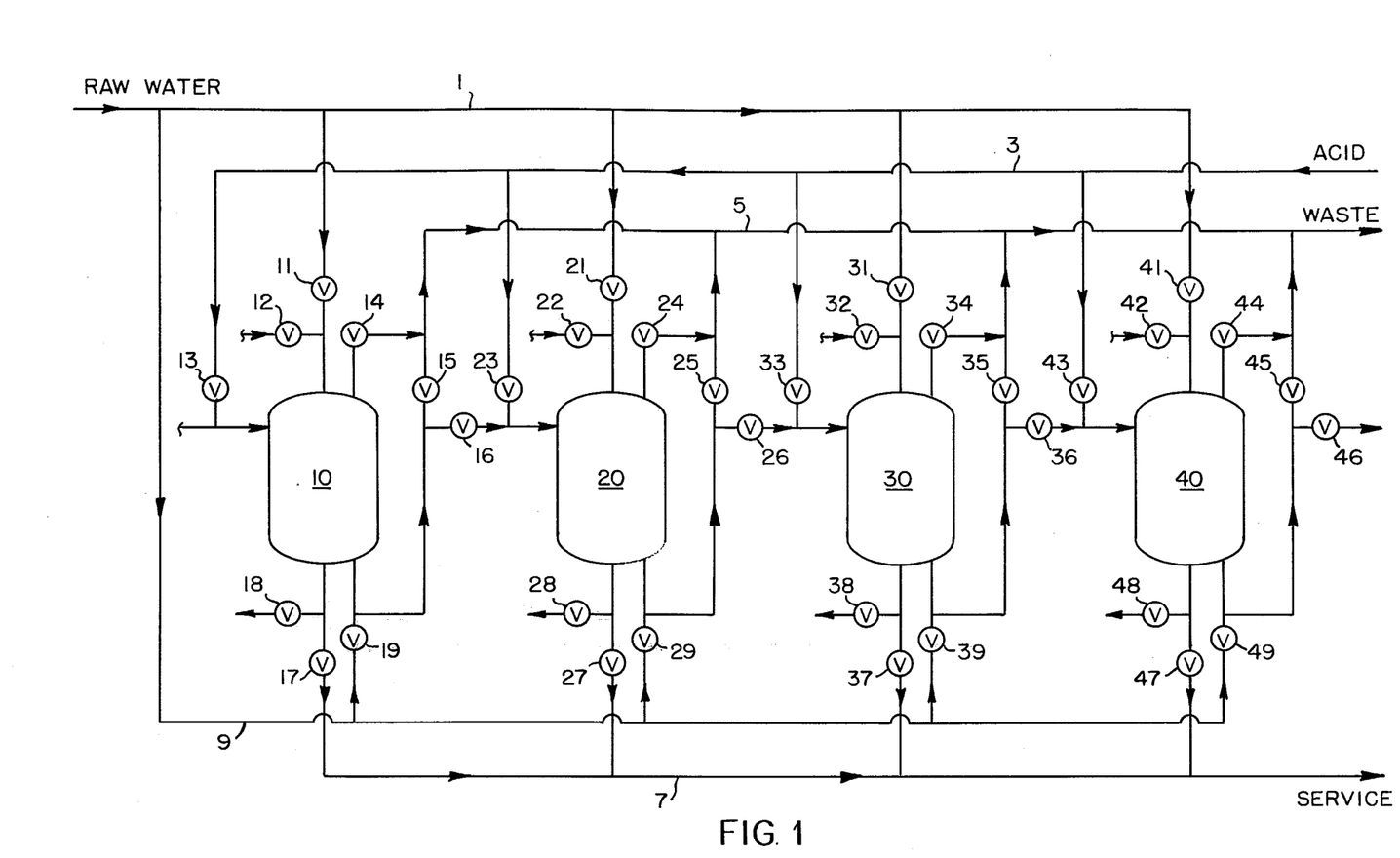
FIG. 1 is a piping schematic of a system utilizing one embodiment of this invention.

FIG. 1 illustrates a system containing four vessels or columns 10, 20, 30, 40, each of which contains a bed of ion exchange material that remains in place during the operation of the system. For purposes of discussion, it will be assumed that the ion exchange material is a cation exchange resin being used to treat raw water and regenerated with acid. Of course, this system could also be used for numerous other ion exchange processes.

The raw water or other fluid being treated is supplied through a fluid inlet line 1, which is connected to service inlet valves 11, 21, 31, 41 at the top of each vessel. The water passing through the vessel may be discharged either through service outlet valves 17, 27, 37, 47, which are connected to a line 7 that carries the purified water to service, or through polisher connection valves 18, 28, 38, 48, that direct the water through interconnecting piping (not shown) to polisher inlet valves 12, 22, 32, 42 at the top of other vessels in the system.

The acid for the regeneration of the resin is supplied through line 3, which is connected to regenerant inlet valves 13, 23, 33, 43 at the top of each column. The partially spent regenerant coming out of the bottom of the first column in each regeneration group passes through a regenerant outlet valve 16, 26, 36, 46 to another vessel wherein the ion exchange capacity of the partially spent regenerant is used up. The spent regenerant discharged from the second vessel in any regeneration group is discharged through bottom waste outlet valves 15, 25, 35, 45 to a waste discharge line 5. The vessels also have top waste outlet valves 14, 24, 34, 44, which are also connected to the waste discharge line 5, and backwash inlet valves 19, 29, 39, 49, which are connected by a backwash line 9 to the raw water supply line 1.

OPERATION

The steps in the operation of the system of FIG. 1 are illustrated in FIG. 2, wherein the diagrams are shaded to represent the portion of resin in the exhausted form as it varies down the columns at the start of each step. For example, at the start of the step illustrated in FIG. 2a the resin at the top of column 20, which operated as a polisher in the previous step, is exhausted but most of the remaining resin in this column is in the regenerated form. Column 10, the other vessel in the service group in FIG. 2a, contains a more thoroughly exhausted bed; i.e. a bed containing a higher percentage of exhausted resin. The bed in column 30, the first column in the regeneration group in this step, is partially regenerated; and column 40, the second column in the regeneration group, contains resin that is substantially completely exhausted.

As in most ion exchanged processes, none of the resin beds in the illustrated process are regenerated to their theoretical ion exchange capacity because it would be uneconomical to do so. Thus, it should be understood that the terms "regenerated resin," "regenerated beds" and "regenerated columns" refer to resin, beds and columns in the highest state of regeneration the system is designed to produce.

Figure 2A:
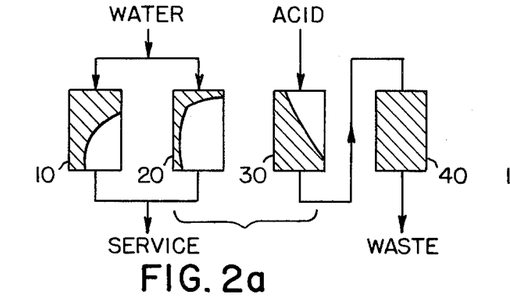
FIGS. 2a–2h are block flow diagrams showing the individual steps in the operating of the system shown in FIG. 1.

In step 2a vessels 10 and 20 are connected in parallel to form a first service group by opening service inlet valves 11 and 21 and service outlet valves 17 and 27. Thus, the raw water being treated passes in parallel through vessels 10 and 20 and is discharged to service through line 7.

At the start of step 2a the resin in vessel 40 is backwashed by opening backwash inlet valve 49 and top waste outlet valve 44. Thus, water passes up through the resin in vessel 40 and is discharged to waste through line 5.

When backwashing is complete, valves 49 and 44 are closed and column 40 is connected in series with column 30 to form a first regeneration group. This is accomplished by opening the regenerant inlet valve 33 for vessel 30, the regenerant outlet valve 36 that connects vessel 30 to vessel 40, and the bottom waste outlet valve 45 from vessel 40. Thus, the regenerant passes down through vessel 30, completing the regeneration of the resin therein, and the partially spent regenerant discharge from column 30 passes down through column 40. The regeneration capacity remaining in the partially spent regenerant from column 30 is substantially completely utilized to bring the bed in column 40 to the partially regenerated state illustrated in FIG. 2b. Thus, regeneration efficiency is improved.

Figure 2B:
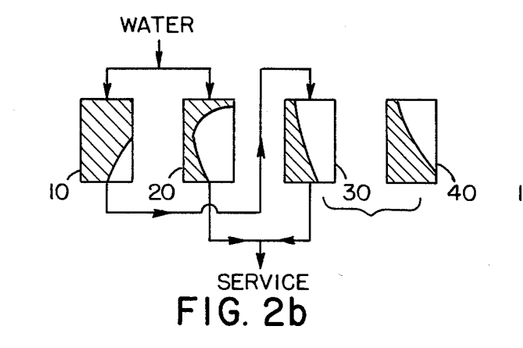
Figure 2C:
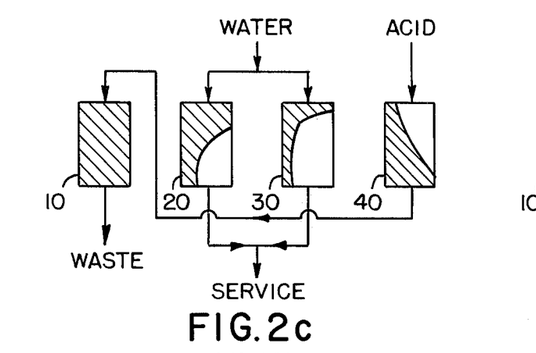
Figure 2D:
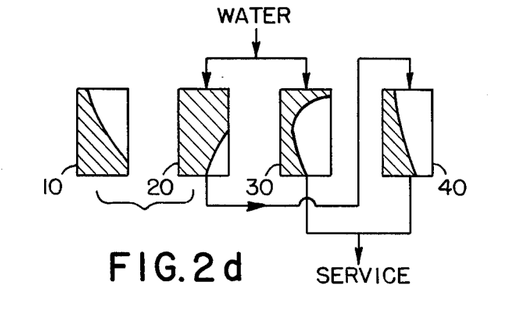

When the resin in vessel 30 has been regenerated, the regenerant inlet valve 33 is closed, service inlet valve 31 is opened, and the resin in vessel 30 is rinsed by passing water down through the column. Like the partially spent regenerant, the rinse effluent from vessel 30 passes through regenerant outlet valve 36, down through vessel 40, and to waste through valve 45, thus utilizing any remaining regeneration capacity in the regenerant rinsed from vessel 30.

As is apparent from the foregoing, each regeneration step in the illustrated process includes three sub-steps; i.e., backwashing the exhausted bed, the actual regeneration, and rinsing the regenerated bed. It should be understood that references herein to the length of the regeneration cycle or the length of a regeneration step include the time needed for backwashing and rinsing if these sub-steps are used, as they are in most ion exchange processes.

After the resin vessel 30 has been regenerated and rinsed, this vessel is removed from the regeneration group, by closing regenerant outlet valve 36, and connected with vessel 10, which contains the most nearly exhausted bed of resin in the first service group, to form a second service group, which is shown in FIG. 2b. In order to place the vessels in this configuration, with vessel 30 downstream from and in series with vessel 10, and vessel 10 and 30 in parallel with vessel 20, service outlet valve 17 and service inlet valve 31 are closed and polisher connection valve 18, polisher inlet valve 32 and service outlet valve 37 are opened. Thus, part of the raw water passes through vessel 10 and then through vessel 30, which acts as a polisher and absorbs cations that leak through vessel 10, and the rest of the water continues to pass directly through vessel 20 to service.

Preferably, vessel 30 is placed in polisher service as soon as it has been regenerated, even if breakthrough or leakage through vessel 10 is not imminent, in which case vessel 30 would not remove any ions until leakage through vessel 10 commenced. Placing vessels in polisher service as soon as they are regenerated provides a safety factor that reduces the need for close monitoring of the effluent from the upstream, or primary resin beds nearing exhaustion.

Of course, it is not generally desirable to design and operate the system so that an excessive amount of time elapses after vessel 30 is placed in polisher service before the resin in vessel 10 is exhausted, since this would increase the time during which vessel 40 is standing idle. Optimum operation with this system is achieved by adjusting the rates at which raw water and regenerant pass through the vessel, the amount of resin in the vessel, the regenerant concentration and other factors which affect the length of the service and/or regeneration cycles, according to techniques well known in the ion exchange art, so that breakthrough from the most exhausted bed in the service group occurs shortly after a polisher bed has been connected in series with it.

The raw water is passed through the second service group, as shown in FIG. 2b, until the resin in vessel 10 is substantially completely exhausted. Again, in order to minimize the periods of time in which vessels and resin are standing idle, it is preferable to design and operate the system so that exhaustion of the resin in the upstream bed occurs as soon as possible after a polisher vessel has been placed in service.

As a general rule, it is preferable to design and operate the system so that the steps illustrated in FIG. 2a, 2c, 2e and 2g, in which two vessels are connected in parallel in service groups and the remaining two vessels are connected in series in regeneration groups, are somewhat longer than the steps illustrated in FIGS. 2b, 2d, 2f, and 2h, in which a freshly regenerated bed is connected in series with a bed nearing exhaustion and a partially regenerated bed is standing idle.

When the resin in vessel 10 has been substantially completely exhausted, this vessel is removed from service by closing service inlet valve 11 and polisher connection valve 18. Vessel 30 is connected in parallel with vessel 20, by closing polisher inlet valve 32 and opening service inlet valve 31, to form the third service group shown in FIG. 2c. Water passes in parallel through vessels 20 and 30 while the regeneration of column 40 is completed and the regeneration of column 10 is begun.

At the beginning of step 2c, vessel 10 is backwashed by opening backwash inlet valve 19 and top waste outlet valve 14. At the end of the backwash step these valves are closed and vessel 10 is connected in series with and downstream from vessel 40, to form the second regeneration group, illustrated in FIG. 2c. The bottom waste outlet valve 45 from vessel 40 is closed and regenerant inlet valve 43, regenerant outlet valve 46 and the bottom waste outlet valve 15 from vessel 10 are opened. Thus, fresh acid passes through vessel 40, completing the regeneration of the resin therein, and the partially spent regenerant effluent from vessel 40 partially regenerates the resin in vessel 10.

When the fresh acid introduction to vessel 40 has been completed, regenerant inlet valve 43 is closed and service inlet valve 41 is opened to rinse column 40. The regenerant rinsed from vessel 40 is passed through vessel 10. Upon completion of the rinse step, valves 41 and 46 are closed to remove vessel 40 from the regeneration group, the service outlet valve 27 from column 20 is closed and valves 28, 41 and 47 are opened to form the fourth service group, illustrated in FIG. 2d. In this configuration, vessel 40 is in series with and downstream from vessel 20, and vessels 40 and 20 are in parallel with vessel 30. Column 40 functions as a polisher, absorbing ions leaking through vessel 20 while the resin in that vessel becomes completely exhausted.

Figure 2E:
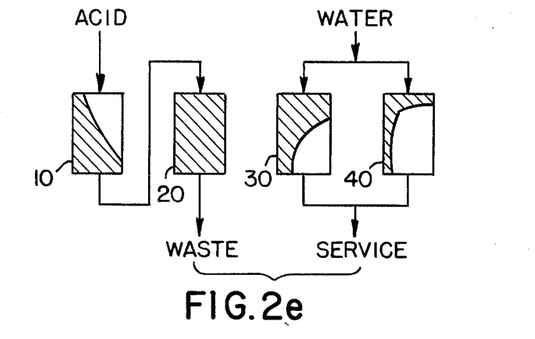
Figure 2F:
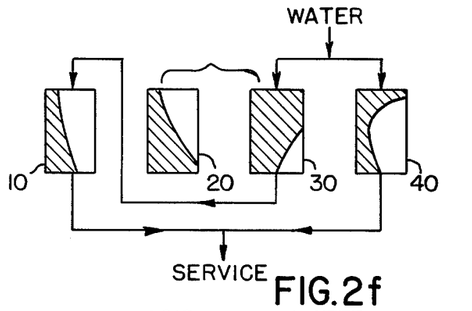
Figure 2G:
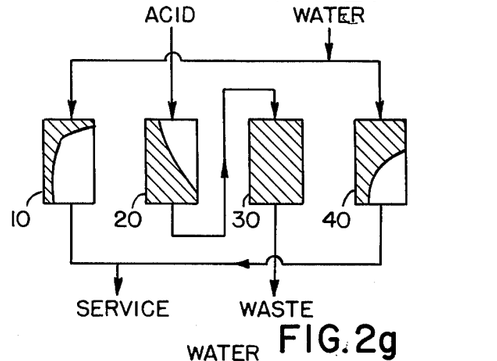
Figure 2H:
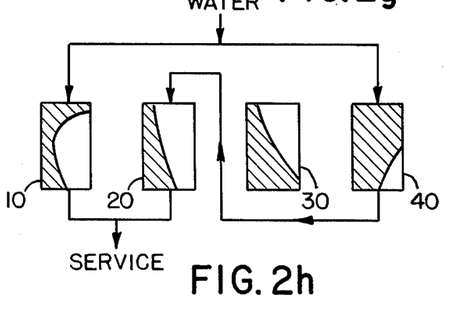

The foregoing steps are continually repeated, by removing exhausted columns from service are connecting them in series with partially regenerated columns to form additional regeneration groups and by connecting regenerated columns in series with nearly exhausted columns. Thus, the points where water and regenerant are introduced gradually move through the system and the beds are exhausted and regenerated in sequence. In FIG. 2e, vessels 30 and 40 are connected in parallel in service and columns 10 and 20 are regenerated in series. In FIG. 2f the regenerated bed in vessel 10 acts as a polisher for vessel 30 while the resin therein becomes completely exhausted. Similarly, in FIG. 2g vessels 40 and 10 are in parallel in service while columns 20 and 30 are regenerated in series, and in FIG. 2h vessel 20 acts as a polisher for vessel 40. At the end of Step 2h, the system is ready for the step illustrated in FIG. 2a and the cycle begins all over again.

By using regenerated columns as polishers for columns nearing exhaustion, and always regenerating a plurality of columns in series, the processes of this invention, like the processes disclosed in the patent and bulletin referred to above, improve the efficiency of exhaustion and regeneration of the ion exchange resin. Furthermore, the processes of this invention, by utilizing vessels connected in parallel in the service groups, balance the time that each vessel remains in service and the length of time during which each column is either being regenerated or standing idle so that the idle or hold time is reduced.

The total system flow is divided between 2 primary service vessels throughout the complete cycle, and each vessel is in primary service for four of the individual steps in the overall cycle illustrated in FIG. 2. Also, each vessel is in the regenerating phase for two steps, in the polishing phase for one of the individual steps, and idle during the remaining step, while another vessel is in polishing service. As may be seen from the Figure, each vessel is in primary service during two steps in which other vessels are regenerated and during two polishing steps.

Now, with the example shown previously, the service flow rate of 1,000 gpm can be divided between two vessels, at 500 gpm per vessel, at all times during the period of a regeneration and polishing step. Based upon flow considerations, the minimum resin inventory per vessel can then be $$\frac{500 \text{ gpm}}{10 \text{ gpm/cubic foot}} = 50 \text{ cubic feet}$$

This volume will permit each vessel to remain in primary service for two regenerating cycles of 40 minutes each plus two polishing steps of ten minutes each when operating at 500 gpm per vessel with water containing 10 grains of exchangeable ions per gallon, as indicated from the calculation $$\frac{50 \text{ cubic feet} \times 10,000 \text{ grains/cubic foot}}{500 \text{ gpm} \times 10 \text{ grains/gallon}} = 100 \text{ minutes.}$$

Thus, four vessels each containing 50 cubic feet of resin for a total of 200 cubic feet for the system would satisfy the design parameters given whereas, as was shown above, if only three vessels were used, a minimum of 100 cubic feet per vessel or a total of 300 cubic feet for the system would be required. Obviously, with smaller resin inventory per vessel and lower flow rates per vessel, smaller vessel sizes and smaller pipe and valve sizes are required.

Figure 3A:
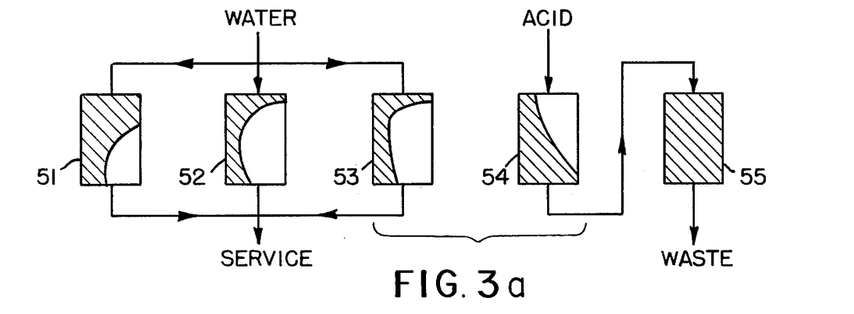
FIGS. 3a–3j are block flow diagrams showing the individual steps in another embodiment of this invention.
Figure 3B:
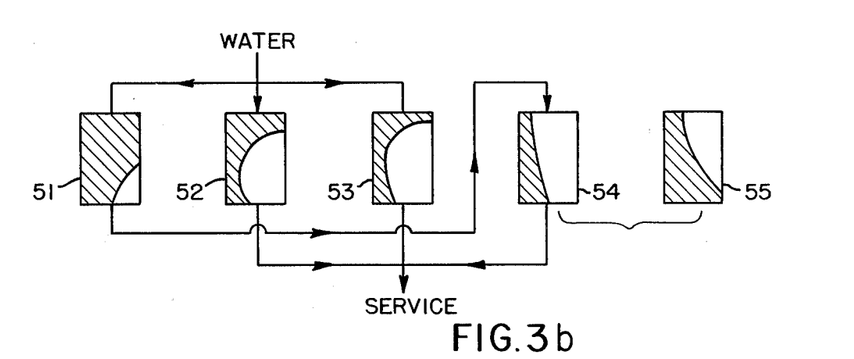
Figure 3C:
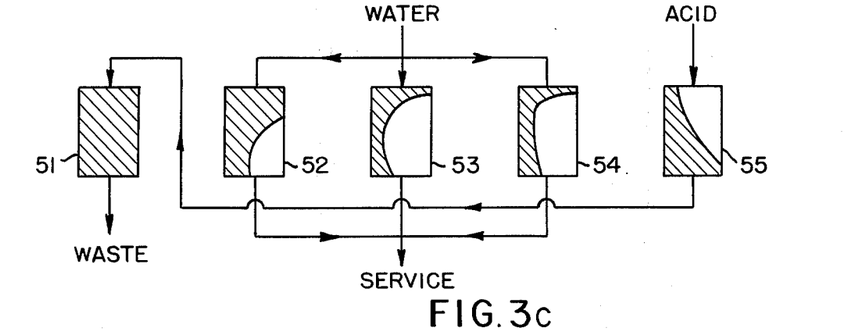

If the length of the service cycle is at least equal to three times the length of a regeneration step plus a polishing step, another vessel and set of piping like those illustated in FIG. 1 may be added to produce a five column system. The first four steps in the operation of a system of this sort are illustrated in FIGS. 3a–3d. In step 3a, three vessels 51, 52, 53 containing beds of partially exhausted ion exchange resin in varying stages of exhaustion are connected in parallel in a first service group. While the water being treated is passing through these vessels; exhausted resin in vessel 55 is backwashed, partially regenerated resin in vessel 54 and the exhausted resin in vessel 54 and the exhausted resin in vessel 55 are regenerated in series to complete the regeneration of column 54 and begin the regeneration of column 55, and column 54 is rinsed. Vessel 54 is then connected in series with vessel 51, which contains the most nearly exhausted bed of resin in the first service group, to form a second service group, which is illustrated in FIG. 3b. In this step, vessel 54 is connected in series with and downstream from vessel 51, and vessels 51 and 54 are operated in parallel with vessels 52 and 53. When the resin in vessel 51 has been substantially completely exhausted, it is removed from service, backwashed, and regenerated in series with vessel 55 in the second regeneration group illustrated in FIG. 3c. At the same time, vessel 54, which was a polisher in the second service group, is connected in parallel with vessels 52 and 53 to form the third service group.

Figure 3D:
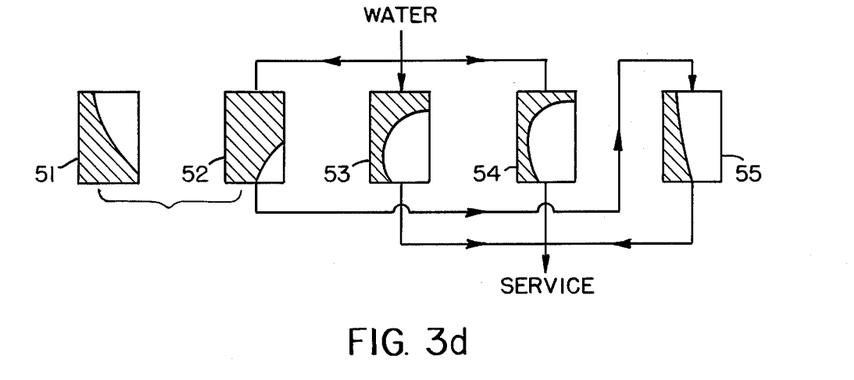
Figure 3E:
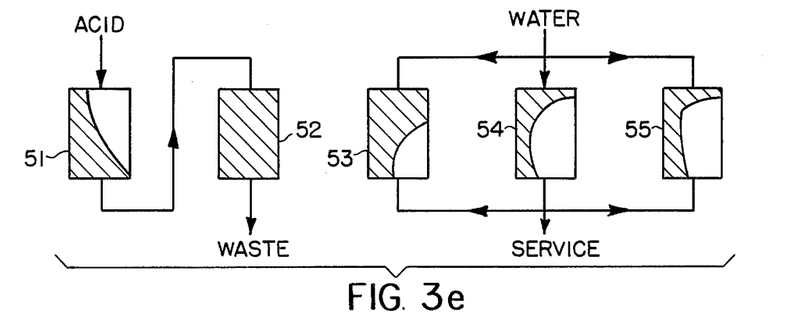
Figure 3F:
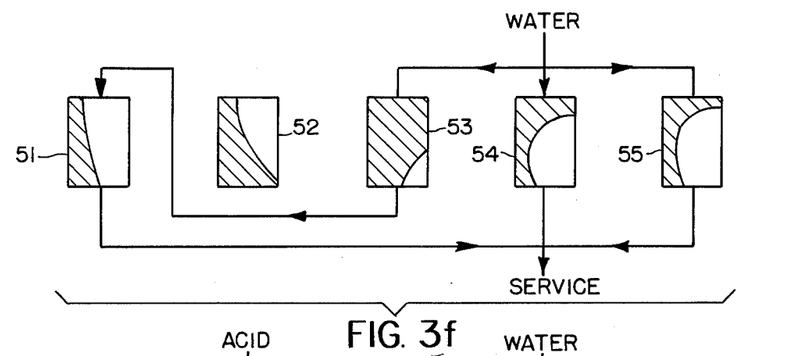
Figure 3G:
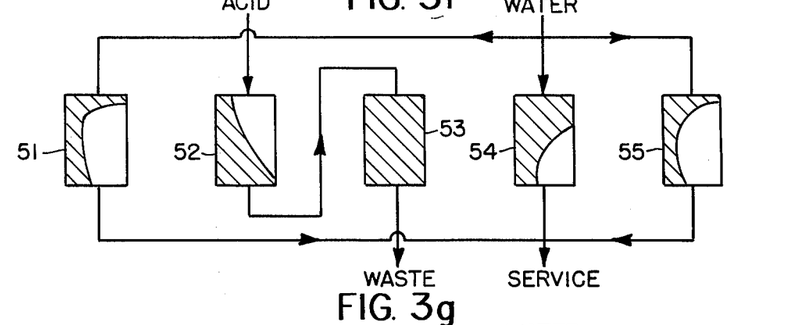
Figure 3H:
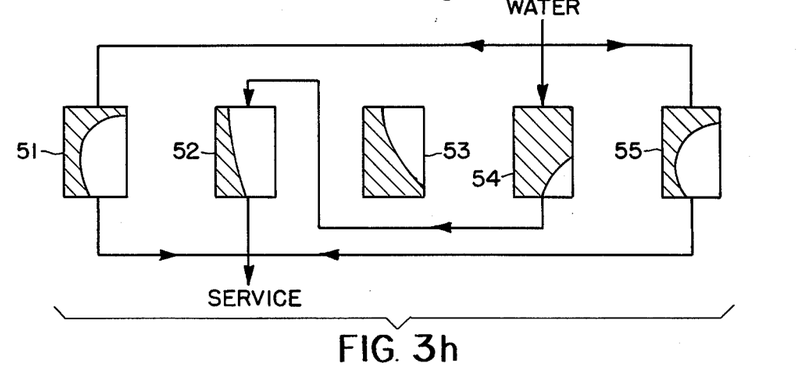
Figure 3I:
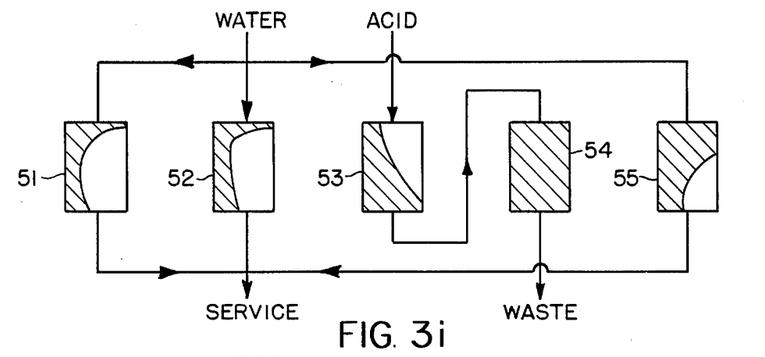
Figure 3J:
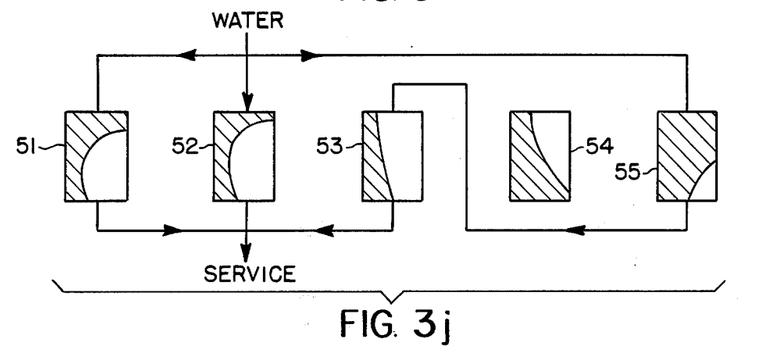

When the resin in vessel 55 has been regenerated and rinsed, this vessel is connected in series with and downstream from vessel 52 and in parallel with vessels 53 and 54 to form the fourth service group; in which vessel 55 functions as a polisher while the resin in vessel 52 is substantially completely exhausted. As in the process illustrated in FIG. 2, the foregoing steps are repeated, by removing vessels containing exhausted resin from service and connecting them in series with and downstream from vessels containing partially regenerated resin to form additional regeneration groups, and by connecting vessels containing regenerated resin in series with vessels containing nearly exhausted resin, so that the beds are exhausted and regenerated in sequence one after the other.

In the next step, vessels 53, 54, 55 are connected in parallel for service and columns 51 and 52 are regenerated in series. When the resin in vessel 51 has been regenerated, this vessel is connected in series with and downstream from vessel 53. When the resin in vessel 53 is exhausted, it is regenerated in series with and downsteam from vessel 52, while vessels 51, 54, and 55 are connected in parallel for service.

Next, vessel 52 is connected in series with and downstream from vessel 54 until that bed is exhausted. When this happens, vessel 54 is regenerated in series with and downstream from vessel 53, while vessels 51, 52, and 55 are connected in parallel for service. The cycle is completed by operating vessel 53 as a polisher downstream from and in series with vessel 55, and in parallel with vessels 51 and 52, until the resin in vessel 55 is exhausted.

The complete cycle for this process contains 10 individual steps illustrated in FIGS. 3a–3j, instead of the 8 individual steps for the process illustrated in FIG. 2. Each vessel is in primary service for six of the steps of the five vessel cycle, in polishing service for one step, in regeneration for two of the steps, and idle for the remaining step. Thus, the total system flow is divided between three primary service vessels throughout the complete cycle. Using design parameters previously given for purposes of illustration, a flow rate of 1,000 gpm would be divided between three vessels at all times during the regeneration and polishing steps, for a total of 333.3 gpm per vessel.

The minimum resin inventory per vessel based upon flow considerations could then be $$\frac{333.3 \text{ gpm}}{10 \text{ gpm/cubic foot}} = 33.33 \text{ cubic feet}$$

Such a resin capacity would permit treatment, at a total flow rate of 1,000 gpm, of an influent containing an ionizable solids content as low as $$\frac{33.33 \text{ cubic feet} \times 10{,}000 \text{ grains/cubic foot}}{1{,}000 \text{ gpm} \times 50 \text{ minutes}} = 6.67 \text{ grains/gal.}$$

Under these conditions, each vessel could remain in primary service for three regenerating cycles of 40 minutes each plus three polishing steps of 10 minutes each requiring a total of 150 minutes, when operating at 333.3 gpm per vessel, as indicated from the following calculation.

$$\frac{33.33 \text{ cubic feet} \times 10{,}000 \text{ grains/cubic foot}}{333.3 \text{ gpm} \times 6.67 \text{ grains/gallon}} = 150 \text{ minutes}$$

Figure 4:
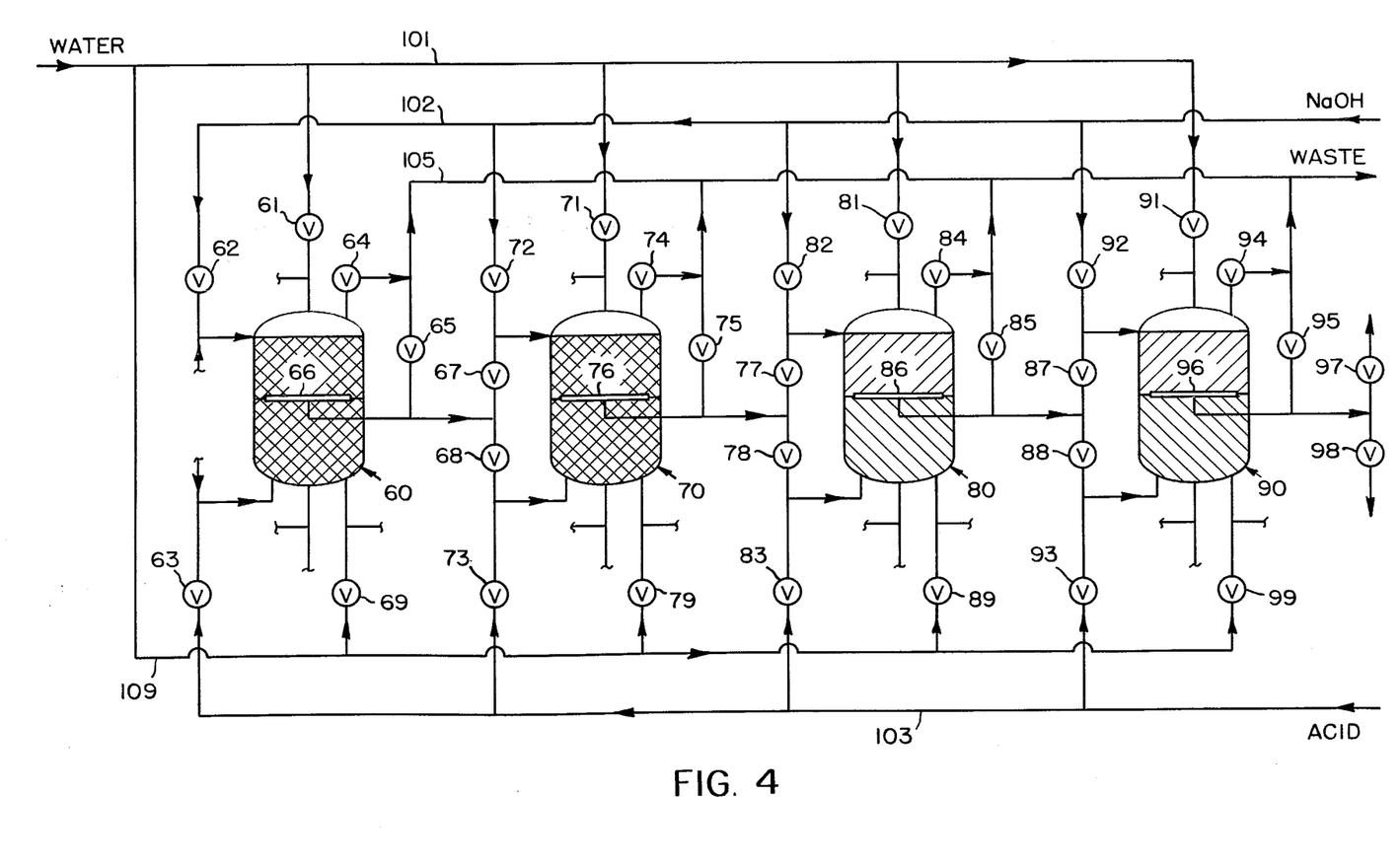
FIG. 4 is a schematic of the regeneration piping for a variant of the system shown in FIG. 1.

The foregoing discussion assumes that the resin in each vessel is of the same type, i.e. either a cation or anion exchange resin. However, the processes of this invention may also be utilized in connection with mixed bed ion exchangers. FIG. 4 illustrates the regeneration piping for a system of this sort. Most of the service piping, which may be the same as the system shown in FIG. 1, has been left out of FIG. 4 for purposes of clarity.

The system shown in FIG. 4 contains four vessels 60, 70, 80 and 90, each of which contains both anion and cation exchange resin. As in the system shown in FIG. 1, each vessel has a service inlet valve 61, 71, 81, 91 connecting the vessel to the main raw water supply line 101; a backwash inlet valve 69, 79, 89, 99 which is connected to the water supply line 101 by a backwash line 109; and a top waste outlet valve 64, 74, 84, 94 connected to a waste discharge line 105. The vessels shown in FIG. 4 each have an anion regenerant inlet valve 62, 72, 82, 92, through which a suitable anion regenerant such as sodium hydroxide may be supplied to the top of the vessel; and a cation regenerant inlet valve 63, 73, 83, and 93, through which a suitable cation regenerant such as acid is fed to the bottom of the vessel. The regenerants, instead of passing completely through the column, are discharged from the column through interface collectors 66, 76, 86, 96 located at an intermediate level in each vessel. During the first step in the regeneration of the anion exchange resin, the partially spent anion regenerant from the first vessel in the regeneration group passes through an anion regenerant outlet valve 67, 77, 87, 97 to the next vessel in the regeneration group. After regeneration and rinsing of the anion resin, the cation bed is regenerated, and the partially spent cation regenerant effluent from the first vessel in the regeneration group passes through a cation regenerant outlet valve 68, 78, 88, 98 to the second vessel in the group. The regenerant effluents from the second vessel in the regeneration group are discharged through a spent regenerant outlet valve 65, 75, 85, 95 to the waste discharge line 105.

FIG. 4 is shaded to indicate the position the different resins occupy in the vessel during exhaustion and regeneration. Slanted lines extending from upper right to lower left represent anion exchange resin, slanted lines extending from upper left to lower right represent cation exchange resin, and cross hatched shading indicates a bed in which the cation and anion exchange resins are mixed. FIG. 4 illustrates the resins during the step which corresponds to the step illustrated in FIG. 2a. In this step, vessels 60 and 70 are connected in parallel to form a service group. The raw water enters the vessel through valves 61 and 71 and is discharged through service outlet valves (not shown) at the bottom of the vessels.

At the beginning of the step shown in FIG. 4 vessel 90, which contains exhausted resin, is backwashed by opening backwash inlet valve 99 and top waste outlet valve 94. Backwashing also separates the resins. The anion exchange resin, which is less dense than the cation exchange resin in the exhausted form, forms a layer at the top of the column above the interface collector 96 and the cation exchange resin forms a layer at the bottom of the column below the interface collector.

When backwashing and separation of the resin are completed, valves 94 and 99 are closed and the resin in vessel 90 is regenerated in series with and downstream from the resin in vessel 80, which was partially regenerated in the last regeneration step. The anion regenerant inlet valve 82 for vessel 80, the anion regenerant outlet valve 87 that connects interface collector 86 to the top of vessel 90, and the spent regenerant outlet valve 95 from vessel 90 are opened. Thus, fresh anion regenerant contacts the anion exchange resin at the top of vessel 80 and completes the regeneration of this resin. The partially spent regenerant is discharged through interface collector 86 and valve 87 and passes down through the anion exchange resin at the top of vessel 90, partially regenerating this resin. The spent regenerant effluent is discharged through interface collector 96 and spent regenerant outlet valve 95 to the waste discharge line 105. During this operation, a slow blocking flow of water may be passed through the backwash inlet valves 89 and 99 and up through the layers of cation exchange resin to keep the anion regenerant from contacting the cation exchange resin.

When the anion exchange resin in vessel 80 has been regenerated, valve 82 is closed and service inlet valve 81 is opened to rinse the anion exchange resin in vessel 80. The rinse effluent is discharged through interface collector 86 and anion regenerant outlet valve 87 so that it passes through the anion exchange resin in vessel 96 and any remaining regeneration capacity is fully utilized.

Cation regenerant is then passed through the layers at the bottom of vessels 80 and 90 by opening cation regenerant inlet valve 83 and the cation regenerant outlet valve 88 that connects the two vessels. Thus, the fresh regenerant first passes through the cation exchange resin in vessel 80, completing its regeneration, and then passes through the cation exchange resin at the bottom of vessel 90, beginning its regeneration. Service inlet valve 81 and/or service inlet valve 91 may be opened slightly during this phase to pass slow blocking flows of water down through the anion exchange resin layers and prevent the cation regenerant from contacting the anion exchange resin.

When the cation exchange resin in vessel 80 has been regenerated, it is rinsed by opening valve 89. Again, the rinse effluent is discharged through cation regenerant outlet valve 88 and passes through the cation exchange resin in vessel 90 so that any remaining regeneration capacity may be utilized. When rinsing has been completed, valve 88 is closed, the top waste outlet valve 84 is opened and the resins in vessel 80 are mixed, by passing air up through the column, to form a mixed bed like those in vessels 60 and 70. Vessel 80 can now be connected in series with either vessel 60 or 70, whichever contains the more exhausted resin, to function as a polisher in the next service group. The individual exhaustion and regeneration steps are repeated, as illustrated in FIG. 2, so that each bed in the system shown in FIG. 4 is exhausted and regenerated in sequence.

The criteria that was discussed above for the optimum service to regeneration ratio for single resin ion exchangers also apply to the mixed bed system illustrated in FIG. 4. Of course, it should be understood that the length of the regeneration cycle for the mixed bed system includes the time needed to regenerate the anion exchange resin plus the time needed to regenerate the cation exchange resin.

Various modifications to the illustrated systems and processes will be readily apparent to those skilled in the art. For example, as discussed in the bulletin referred to above, the regenerants may be diluted between the first and second beds in a regeneration group or the regenerants may be passed up through the first bed in the regeneration group and down through the second. Similarly, the beds may be regenerated with three times the stoichiometric quantity of regenerant, as illustrated in the above mentioned patent and bulletin, by adding another vessel to the system and regenerating two partially regenerated beds in series with each exhausted bed. These and a number of other modifications may be made within the scope of this invention, which is defined by the following claims.

I claim:

1. A method of operating an ion exchange system having four vessels, each of which contains a bed of ion exchange resin that remains in the vessel during exhaustion and regeneration, and valve and conduit means for connecting said vessels for both series and parallel flow, comprising:
    a. connecting a first vessel containing a partially exhausted bed in parallel with a second vessel containing a partially exhausted bed that is less exhausted than the bed in said first vessel to form a first service group, passing fluid to be treated in parallel through said first and second vessels and, at the same time, passing regenerant through a third vessel containing a partially regenerated bed and then through a fourth vessel containing an exhausted bed until the bed in said third vessel is regenerated and the bed in said fourth vessel is partially regenerated;
    b. connecting said third vessel in series with said first vessel, with said third vessel downstream from said first vessel and said first and third vessels in parallel with said second vessel, to form a second service group, and passing the fluid to be treated through said second service group until the bed in said first vessel is exhausted;
    c. removing said first vessel from service, connecting said second and said third vessel in parallel to form a third service group, passing the fluid to be treated in parallel through said second and third vessels and, at the same time, passing regenerant through said fourth vessel and then through said first vessel until the bed in the fourth vessel is regenerated and the bed in the first vessel is partially regenerated;
    d. connecting said fourth vessel in series with said second vessel, with said fourth vessel downstream from said second vessel and the fourth and second vessels in parallel with the third vessel, to form a fourth service group, and passing the fluid to be treated through the fourth service group until the bed in the second vessel is exhausted;
    e. removing said second vessel from service, connecting said third and fourth vessels in parallel to form a fifth service group, passing the fluid being treated in parallel through said third and fourth vessels and, at the same time, passing regenerant through said first vessel and then through said second vessel until the bed in said first vessel is regenerated and the bed in said second vessel is partially regenerated;
    f. connecting said first vessel in series with said third vessel, with said first vessel downstream from said third vessel and the third and first vessels in parallel with the fourth vessel, to form a sixth service group, and passing the fluid to be treated through this service group until the bed in said third vessel is exhausted;
    g. removing said third vessel from service, connecting said fourth vessel and said first vessel in parallel to form a seventh service group, passing the fluid to be treated in parallel through said fourth and first vessels and, at the same time, passing regenerant through said second vessel and then through said third vessel until the bed in the second vessel is regenerated and the bed in the third vessel is partially regenerated;
    h. connecting said second vessel in series with the fourth vessel, with the second vessel downstream from the fourth vessel and the fourth and second vessels in parallel with said first vessel, to form an eighth service group, and passing the fluid being treated through said service group until the bed in the fourth vessel is exhausted; and
    i. repeating the foregoing sequence.

2. A method of operating an ion exchange system having five vessels, each containing a bed of ion exchange resin that remains in the vessel during exhaustion and regeneration, and valve and conduit means for connecting said vessels for both series and parallel flow, comprising:
    a. connecting first, second and third vessels containing beds of partially exhausted ion exchange resin in differing stages of exhaustion in parallel to form a first service group, with said first vessel containing the most thoroughly exhausted bed and said third vessel containing the least exhausted bed, passing fluid to be treated in parallel through said first, second and third vessels and, at the same time, passing regenerant through a fourth vessel containing a partially regenerated bed and then through a fifth vessel containing an exhausted bed until the bed in said fourth vessel is regenerated and the bed in said fifth vessel is partially regenerated;
    b. connecting said fourth vessel in series with and downstream from said first vessel, with the first and fourth vessels in parallel with said second and said third vessels, to form a second service group, and passing the fluid being treated through this service group until the bed in said first vessel is exhausted;
    c. removing said first vessel from service, connecting said second, third and fourth vessels in parallel to form a third service group, passing the fluid to be treated in parallel through said second, third and fourth vessels and, at the same time, passing regenerant through said fifth vessel and then through said first vessel until the bed in said fifth vessel is regenerated and the bed in said first vessel is partially regenerated;

d. connecting said fifth vessel in series with and downstream from said second vessel, with the fifth and second vessels in parallel with said third and fourth vessels, to form a fourth service group, and passing the fluid being treated through this service group until the bed in the second vessel is exhausted;

e. removing said second vessel from service, connecting said third, fourth and fifth vessels in parallel to form a fifth service group, passing the fluid to be treated in parallel through said third, fourth and fifth vessels and, at the same time, passing regenerant through said first vessel and then through said second vessel until the bed in said first vessel is regenerated and the bed in said second vessel is partially regenerated;

f. connecting said first vessel in series with and downstream from said third vessel, with the first and third vessels in parallel with the fourth and fifth vessels, to form a sixth service group, and passing the fluid being treated through this service group until the bed in the third vessel is exhausted;

g. removing the third vessel from service, connecting the first, fourth and fifth vessels in parallel to form a seventh service group, passing the fluid to be treated in parallel through said first, fourth and fifth vessels and, at the same time, passing regenerant through said second vessel and then through said third vessel until the bed in said second vessel is regenerated and the bed in said third vessel is partially regenerated;

h. connecting said second vessel in series with and downstream from said fourth vessel, with said second and fourth vessels in parallel with said first and fifth vessels, to form an eighth service group, and passing the fluid being treated through this service group until the resin in the fourth vessel is exhausted;

i. removing said fourth vessel from service, connecting said first, second and fifth vessels in parallel to form a ninth service group, passing the fluid to be treated in parallel through said first, second and fifth vessels and, at the same time passing regenerant through said third vessel and then through said fourth vessel until the bed in said third vessel is regenerated and the bed in said fourth vessel is. partially regenerated;

j. connecting said third vessel in series with and downstream from said fifth vessel, with the fifth and third vessels in parallel with said first and second vessels, to form a tenth service group, and passing the fluid being treated through this service group until the bed in the fifth vessel is exhausted; and k. repeating the foregoing sequence.

3. A method of operating an ion exchange system having at least four vessels, each of which contains a bed of ion exchange material that remains in the vessel during exhaustion and regeneration, and valve and conduit means for connecting said vessels for both series and parallel flow, comprising exhausting and regenerating said beds of ion exchange material in sequence one after another by:

a. connecting two or more of said vessels, containing beds of ion exchange material in differing stages of exhaustion in parallel to form a first service group, passing a fluid to be treated in parallel through these vessels and, at the same time, connecting two or more other vessels containing beds of ion exchange material in differing stages of regeneration in series to form a first regeneration group, with a primary vessel containing the most completely regenerated ion exchange material at the upstream end of the series and a last vessel containing exhausted resin at the downstream end of said regeneration group, the total number of vessels in said first service group and said first regeneration group being equal to the number of vessels in said system, and passing regenerant in series through the regeneration group, whereby the regenerant contacts the most completely regenerated ion exchange material first and contacts said exhausted ion exchange material last, until the ion exchange material in said primary vessel has been regenerated and said exhausted ion exchange material in said last vessel has been partially regenerated;

b. removing said primary vessel from said regeneration group and connecting this vessel in series with and downstream from a first vessel from said first service group, containing the most nearly exhausted bed in said first service group, with said primary vessel from said first regeneration group and said first vessel from said first service group in parallel with the other vessel or vessels remaining from said first service group, to form a second service group, and passing the fluid being treated through said second service group until the bed in the first vessel from the first service group is exhausted;

c. removing said first vessel from the second service group, connecting said primary vessel from the first regeneration group in parallel with the other vessel or vessels remaining from said second service group to form a third service group; and, at the same time, connecting said first vessel in series with and downstream from the vessel or vessels remaining from the first regeneration group to form a second regeneration group and passing regenerant in series through this regeneration group, whereby the regenerant passes first through a primary vessel in said second regeneration group, containing the most completely regenerated ion exchange material in the second regeneration group, and through said first vessel last, until the ion exchange material in said primary vessel in the second regeneration group has been regenerated and the exhausted ion exchange material in said first vessel has been partially regenerated;

d. removing said primary vessel from said second regeneration group and connecting this vessel in series with and downstream from a second vessel from said third service group, containing the most nearly exhausted bed in said third service group, with said primary vessel from said second regeneration group and said second vessel in parallel with the other vessel or vessels remaining from said third service group, to form a fourth service group, and passing the fluid being treated through said fourth service group until the bed in said second vessel is exhausted;

e. removing said second vessel from the fourth service group, connecting said primary vessel from the second regeneration group in parallel with the other vessel or vessels remaining from said fourth service group to form a fifth service group; and, at the same time, connecting said second vessel in series with and downstream from the vessel or vessels remaining from the second regeneration group to form a third regeneration group and passing regenerant in series through this regeneration group, whereby the regenerant passes first through a primary vessel in said third regeneration group, containing the most completely regenerated ion exchange material in the third regeneration group, and through said second vessel last, until the ion exchange material in said primary vessel in the third regeneration group has been regenerated and the exhausted ion exchange material in said second vessel has been partially regenerated;

f. removing said primary vessel from said third regeneration group and connecting this vessel in series with and downstream from a third vessel from said fifth service group, containing the most nearly exhausted bed in said fifth service group, with said primary vessel from said third regeneration group and said third vessel in parallel with the other vessel or vessels remaining from said fifth service group, to form a sixth service group, and passing the fluid being treated through said sixth service group until the bed in said third vessel is exhausted;

g. removing said third vessel from the sixth service group, connecting said primary vessel from the third regeneration group in parallel with the other vessel or vessels remaining from said sixth service group to form a seventh service group; and, at the same time, connecting said third vessel in series with and downstream from the vessel or vessels remaining from the third regeneration group to form a fourth regeneration group and passing regenerant in series through this regeneration group, whereby the regenerant passes first through a primary vessel in said fourth regeneration group, containing the most completely regenerated ion exchange material in the fourth regeneration group, and through said third vessel last, until the ion exchange material in said primary vessel in the fourth regeneration group has been regenerated and the exhausted ion exchange material in said third vessel has been partially regenerated;

h. removing said primary vessel from said fourth regeneration group and connecting this vessel in series with and downstream from a fourth vessel from said seventh service group, containing the most nearly exhausted bed in said seventh service group, with said primary vessel from said fourth regeneration group and said fourth vessel in parallel with the other vessel or vessels remaining from said seventh service group, to form an eighth service group, and passing the fluid being treated through said eighth service group until the bed in said fourth vessel is exhausted; and i. continuing to remove vessels containing exhausted ion exchange material from service and to connect them in series with and downstream from at least one vessel containing partially regenerated ion exchange material to form additional regeneration groups, and continuing to connect vessels containing regenerated ion exchange material in series with and downstream from vessels containing the most nearly exhausted ion exchange material from the previous service group to form new service groups, whereby the points where the fluid being treated and the regenerant are introduced gradually move through the system and the beds of ion exchange material are exhausted and regenerated in sequence one after another.

* * * * *